US008636495B2

(12) United States Patent
Maruyama et al.

(10) Patent No.: US 8,636,495 B2
(45) Date of Patent: Jan. 28, 2014

(54) ABNORMALITY DETECTOR FOR AN INJECTION MOLDING MACHINE

(75) Inventors: Junpei Maruyama, Yamanashi (JP); Minoru Kobayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/613,176

(22) Filed: Sep. 13, 2012

(65) Prior Publication Data

US 2013/0156875 A1    Jun. 20, 2013

(30) Foreign Application Priority Data

Dec. 20, 2011  (JP) .................................. 2011-278810

(51) Int. Cl.
  *B29C 45/77*  (2006.01)
(52) U.S. Cl.
  USPC ......... 425/145; 264/40.5; 264/40.7; 425/149; 425/150
(58) Field of Classification Search
  USPC ................. 425/145, 149, 150; 264/40.5, 40.7
  See application file for complete search history.

(56) References Cited

U.S. PATENT DOCUMENTS

| 6,409,495 | B1 | 6/2002 | Kamiguchi et al. |
| 6,527,534 | B1 | 3/2003 | Kamiguchi et al. |
| 7,305,313 | B2 | 12/2007 | Fujii et al. |
| 2012/0248658 | A1* | 10/2012 | Gleiman et al. ............ 425/174.6 |
| 2013/0095200 | A1* | 4/2013 | Maruyama et al. ............ 425/171 |

FOREIGN PATENT DOCUMENTS

| JP | 2-008025 A | 1/1990 |
| JP | 2-106315 A | 4/1990 |
| JP | 2001-030326 A | 2/2001 |
| JP | 2001-038775 A | 2/2001 |
| JP | 2004-330527 A | 11/2004 |
| JP | 2004330529 A | 11/2004 |
| JP | 2005-280015 A | 10/2005 |
| JP | 2006-228181 A | 8/2006 |

OTHER PUBLICATIONS

Office Action corresponding to JP 2011-278810, dated Nov. 13, 2012.

* cited by examiner

*Primary Examiner* — Tim Heitbrink
(74) *Attorney, Agent, or Firm* — Lowe Hauptman & Ham LLP

(57) ABSTRACT

A movable unit in an injection molding machine is started to operate and the current physical quantity and the current time (or current position of the movable unit) are detected. The current physical quantity is stored as a reference physical quantity in association with the elapsed time of operation of the movable unit (or position of the movable unit). A deviation of the current physical quantity from the reference physical quantity is calculated and stored, a distribution index value is then calculated from the physical quantity deviations in the first to n-th cycles, and a threshold value is determined from the distribution index value. When the deviation exceeds the threshold value, alarm processing is performed.

8 Claims, 5 Drawing Sheets

ABNORMALITY DETECTOR FOR AN INJECTION MOLDING MACHINE

RELATED APPLICATIONS

The present application claims priority from, Japanese Application Number 2011-278810, filed Dec. 20, 2011, the disclosure of which is hereby incorporated by reference herein in its entirety.

BACKGROUND OF THE INVENTION

1. Field of the Invention

The present invention relates to an abnormality detector for an injection molding machine.

2. Description of the Related Art

In the mold opening/closing operation and molded product ejecting operation in an injection molding cycle for manufacturing a molded product using an injection molding machine, a reference load on the motor driving a movable unit is stored in association with the time or the position of the movable unit and an actual motor load is sequentially compared with the stored reference load in association with the time or the position of the movable unit, so that, when the actual load deviates from the reference load by more than a predetermined threshold value, an abnormality in the mold opening/closing operation or ejecting operation is detected and the injection molding machine is stopped to avoid damage to the mechanism section and/or mold.

Japanese Patent Application Laid-Open Nos. 2001-30326 and 2001-38775, for example, disclose techniques for avoiding damage to the mechanism section and/or mold in an injection molding machine by setting as a reference load a load under which a normal mold opening/closing operation and/or ejecting operation was performed at least once in the past or a moving average value calculated from the loads under which a normal mold opening/closing operation and/or ejecting operation was performed several times in the past. The techniques described in these patent documents, however, the threshold value for abnormality detection must be set by the operator and the threshold value setting operation could be a burden on the operator.

Japanese Patent Application Laid-Open Nos. 2004-330529 and 2005-280015 disclose techniques for controlling an injection molding machine by determining a threshold value from an average value or variance of the motor currents detected in the past. In the techniques described in these patent documents, a monitoring range is set on the basis of the average value and/or variance of the motor currents detected in the past. The distribution of motor current variations might differ, however, from a normal distribution when the mold guide pins fit into the guide bushes during a mold closing operation or when the mold intermediate plate touches the movable plate. Some shapes of distribution could cause the threshold value calculated on the basis of the average value and/or variance of the motor currents detected in the past to become lower than an appropriate value and cause erroneous detection of abnormalities.

Although it does not relate to a technique for detecting abnormalities in an injection molding machine, Japanese Patent Application Laid-Open No. 2006-228181 discloses a technique and device for displaying variations of predetermined qualities of a plurality of products manufactured in a manufacturing facility, wherein quality data having a frequency distribution not approximating a normal distribution is transformed so as to approximate the normal distribution, an average value and various statistics are then calculated from the transformed quality data, and inverse transformation is carried out with respect to the calculated average value and various statistics to produce an average value and various statistics for the quality data.

SUMMARY OF THE INVENTION

To solve the foregoing problems, an object of the present invention is to reduce the burden on the operator by automatically setting threshold values for abnormality detection. Another object of the present invention is to provide an abnormality detector for injection molding machine capable of detecting abnormalities on the basis of appropriate threshold values even if the physical quantity variation distributions used for abnormality detection are different from a normal distribution.

A first aspect of the abnormality detector for injection molding machine according to the present invention includes a drive unit for driving a movable unit by driving and controlling a servo motor, a physical quantity detecting unit for detecting any one of physical quantities which include a load applied to the servo motor and speed, current and position error of the servo motor, a storage unit for storing the physical quantity detected by the physical quantity detecting unit as a reference physical quantity in association with an elapsed time of operation of the movable unit or a position of the movable unit in operation, a physical quantity deviation calculating unit for determining a deviation by sequentially comparing the current physical quantity with the reference physical quantity stored in the storage unit, in association with the elapsed time of operation of the movable unit or the position of the movable unit in operation, a distribution index value calculating unit for calculating at least one of kurtosis and skewness of the determined physical quantity deviation and a distribution index value determined from a third- or higher-order moment as a distribution index value in association with the elapsed time of operation of the movable unit or the position of the movable unit in operation, and a threshold value calculating unit for calculating a threshold value corresponding to the elapsed time of operation of the movable unit or the position of the movable unit in operation, such that the threshold value increases as the distribution index value calculated by the distribution index value calculating unit increases. When the deviation determined by the physical quantity deviation calculating unit exceeds the threshold value calculated by the threshold value calculating unit, an abnormality is detected.

A second aspect of the abnormality detector for injection molding machine according to the present invention includes a drive unit for driving a movable unit by driving and controlling a servo motor, a physical quantity detecting unit for detecting any one of physical quantities which include a load applied to the servo motor and speed, current and position error of the servo motor, a calculating unit for calculating an average value of the physical quantities detected by the physical quantity detecting unit over a predetermined number of cycles, in association with the elapsed time of operation of the movable unit or the position of the movable unit in operation, a storage unit for storing the average physical quantity value calculated by the calculating unit, a physical quantity deviation calculating unit for determining a deviation by sequentially comparing the current physical quantity with the average physical quantity value stored in the storage unit, in association with the elapsed time of operation of the movable unit or the position of the movable unit in operation, a distribution index value calculating unit for calculating at least one of kurtosis and skewness of the determined physical quantity deviation and a distribution index value determined from a third- or higher-order moment as a distribution index value in association with the elapsed time of operation of the movable unit or the position of the movable unit in operation, and a threshold value calculating unit for calculating a threshold value corresponding to the elapsed time of operation of the movable unit or the position of the movable unit in operation, such that the threshold value increases as the distribution index value calculated by the distribution index value calculating unit increases. When the deviation determined by the physical quantity deviation calculating unit exceeds the threshold value calculated by the threshold value calculating unit, an abnormality is detected.

The abnormality detector for injection molding machine may further include an average value calculating unit for calculating an average value of absolute physical quantity deviations by computing an equation below in association with the elapsed time of operation of the movable unit or the position of the movable unit in operation;

$$R(n, x) = \frac{|E(n, x)|}{n} + R(n-1, x) \cdot \frac{n-1}{n}$$

n: Number of cycles since calculation of threshold value is initiated, x: Elapsed time or position of movable unit R(n, x): Average value of absolute deviations at x in first to n-th cycles, E(n, x): Deviation at x in n-th cycle;

wherein the distribution index value calculating unit calculates a distribution index value by computing an equation below from the average value of absolute physical quantity deviations calculated by the average value calculating unit, in association with the elapsed time of operation of the movable unit or the position of the movable unit in operation;

$$K(n, x) = \frac{E(n, x)^m}{R(n, x)^m} \cdot \frac{1}{n} + K(n-1, x) \cdot \frac{R(n-1, x)^m}{R(n, x)^m} \cdot \frac{n-1}{n}$$

K(n, x): Approximate value of distribution index values at x in first to n-th cycles m: Order of moment (m≥3);

wherein the threshold value calculating unit calculates a threshold value by computing an equation below from the distribution index value calculated by the distribution index value calculating unit, in association with the elapsed time of operation of the movable unit or the position of the movable unit in operation;

$$L(n,x) = \alpha \cdot K(n,x) + \beta$$

L(n, x): Threshold value at x in n-th cycle,

α, β: Coefficients (α>0).

The abnormality detector for injection molding machine may further include a variation index calculating unit for calculating a variation index of the determined deviations in association with the elapsed time of operation of the movable unit or the position of the movable unit in operation, and a threshold value correcting unit for correcting the threshold value corresponding to the elapsed time of operation of the movable unit or the position of the movable unit in operation, such that the threshold value increases as the variation index calculated by the variation index calculating unit increases.

The variation index calculating unit may calculate as a deviation variation index any one of a standard deviation and variance of the physical quantity, an average value of absolute deviations, and maximum/minimum values.

The present invention can reduce the burden on the operator by automatically setting threshold values for abnormality detection. Furthermore, the present invention can provide an abnormality detector for detecting abnormalities on the basis of appropriate threshold values even if a physical quantity variation distribution for abnormality detection is different from a normal distribution.

BRIEF DESCRIPTION OF THE DRAWINGS

These and other objects and features of the present invention will be apparent from the following description of embodiments with reference to the appended drawings, in which.

DETAILED DESCRIPTION OF THE PREFERRED EMBODIMENTS

Figure 1:
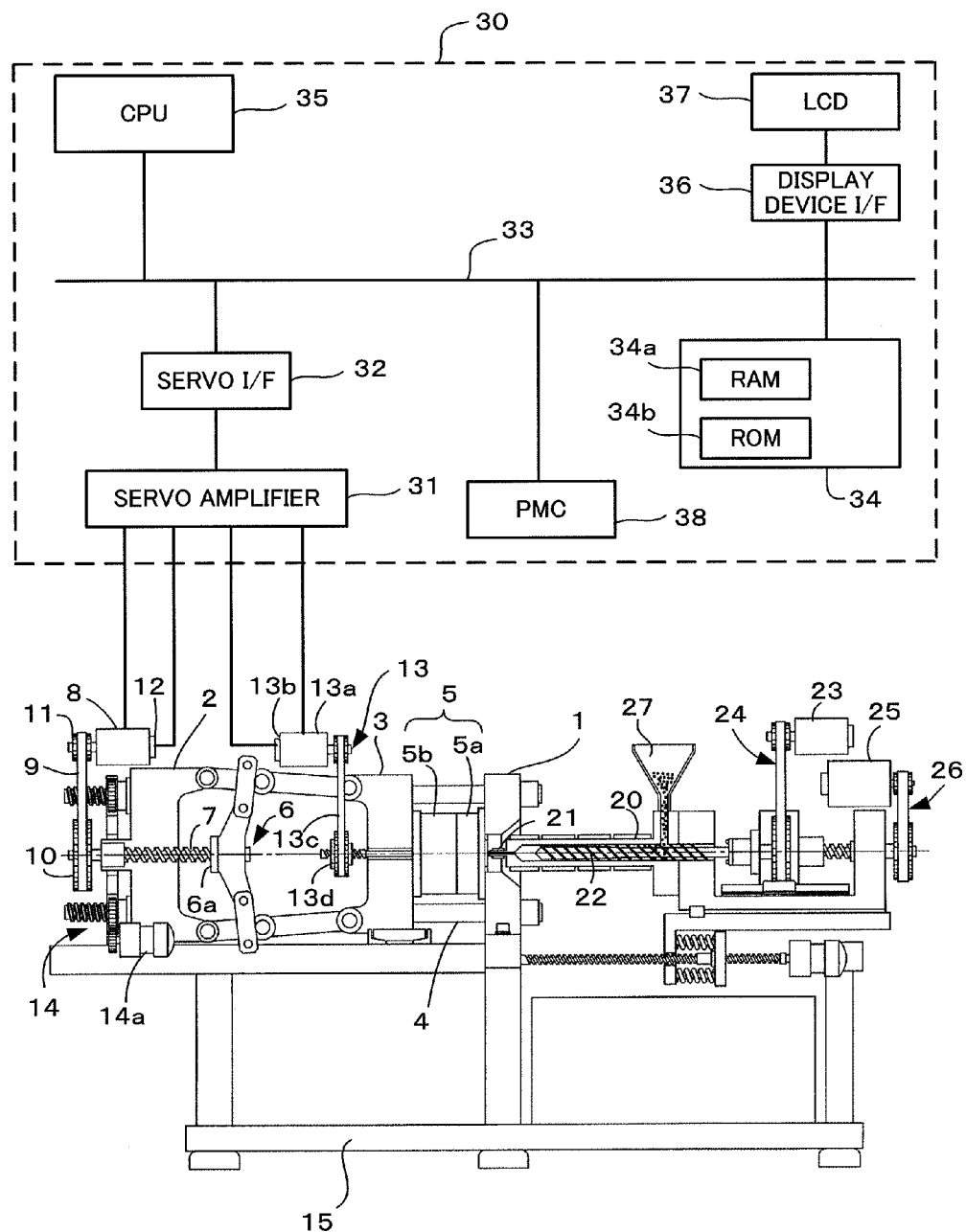
FIG. 1 is a block diagram showing main components of an embodiment of the abnormality detector for injection molding machine according to the present invention.

An abnormality detector for injection molding machine according to the present invention has a load deviation calculating unit and a threshold value calculating unit. The load deviation calculating unit calculates a deviation of the current load on a movable unit from the previously stored reference load in association with the time or the position of the movable unit. It compares the load deviation calculated in association with the time or the position of the movable unit with the predetermined threshold value, so that, when the load deviation exceeds the threshold value, an abnormality is detected. On the other hand, the threshold value calculating unit calculates as a distribution index value at least one of the kurtosis, skewness, and high-order moment of the load deviation calculated by the load deviation calculating unit in association with the time or the position of the movable unit, and then calculates, on the basis of the calculated distribution index value, a threshold value for abnormality detection in association with the time or the position of the movable unit. When calculating the threshold value, the threshold value calculating unit sets a relatively high threshold value when the calculated distribution index value is high, and sets a relatively small threshold value when the calculated distribution index value is low.

An embodiment of the abnormality detector for injection molding machine according to the present invention will now be described with reference to the block diagram showing main components in FIG. 1.

The main body of the injection molding machine has on a machine base 15 a mold clamping section including a fixed platen 1, rear platen 2, movable platen 3, and toggle link mechanism 6, and an injecting section including an injection cylinder 20, injection screw 22, and injection servo motor 25.

The mold clamping section and injecting section have movable units such as a movable platen 3, ejector device 13, and injection screw 22 as described later.

First, the mold clamping section will be described. The fixed platen 1 is connected to the rear platen 2 via a plurality of tie bars 4. The movable platen 3 is disposed between the fixed platen 1 and the rear platen 2 so as to be movable along the tie bars 4. A fixed-side mold 5a is attached to the fixed platen 1 and a movable-side mold 5b is attached to the movable platen 3. The fixed-side mold 5a and movable-side mold 5b form a mold 5.

The toggle link mechanism 6 is disposed between the rear platen 2 and the movable platen 3, and a nut provided on a crosshead 6a of the toggle link mechanism 6 is engaged with a ball screw 7 that is mounted rotatably, but unmovably in the axial direction, on the rear platen 2. A belt (timing belt) 9 is looped between a pulley 10 provided on the ball screw 7 and a pulley 11 provided on the output shaft of the mold clamping servo motor 8.

When the mold clamping servo motor 8 is driven, the ball screw 7 is driven via a power transmitting means including the pulley 11, belt 9, and pulley 10 and the toggle link mechanism 6 is driven by moving the crosshead 6a on the toggle link mechanism 6 forward (rightward in FIG. 1) and backward (leftward in FIG. 1), thereby moving the movable platen 3 toward the fixed platen 1 (advancing) and away from the fixed platen 1 (retreating) to close, clamp, and open the mold 5 (fixed-side mold 5a and movable-side mold 5b).

A position/speed detector 12 such as an encoder is attached to the mold clamping servo motor 8 to detect the rotational position/speed of the mold clamping servo motor 8. The position of the crosshead 6a (position of the movable platen 3 (movable-side mold 5b)) is detected from a position feedback signal from the position/speed detector 12.

The ejector device 13 is a device for ejecting the molded product out of the mold 5 (movable-side mold 5b) disposed on the movable platen 3. The ejector device 13 thrusts an eject pin (not shown) into the mold 5 (movable-side mold 5b) to eject the molded product out of the mold 5 (movable-side mold 5b) by transmitting the torque of the ejector servo motor 13a to the eject pin via a power transmitting means 13c including pulleys and a belt (timing belt) and a ball screw/nut mechanism 13d. A position/speed detector 13b is attached to the ejector servo motor 13a to detect the position/speed of the eject pin by detecting the rotational position/speed of the ejector servo motor 13a.

The rear platen 2 is provided with a mold clamping force adjusting mechanism 14 including a mold clamping force adjusting motor 14a. The mold clamping force is adjusted by driving the mold clamping force adjusting motor 14a to rotate the nut (not shown) engaged with a screw provided for the tie bars 4 via a transmission mechanism and thus shift the position of the rear platen 2 with respect to the tie bars 4 (i.e., shifting the position of the rear platen 2 with respect to the fixed platen 1 on the machine base 15). The mold clamping device, ejector mechanism, and other components described above are the known components found in conventional injection molding machines.

Next, the injecting section will be described. A hopper 27 is disposed above the injection cylinder 20 to supply resin material into the injection cylinder 20. The injection cylinder 20 has a nozzle 21 attached to the leading end thereof and an injection screw 22 inserted therethrough.

The injecting section is provided with a pressure sensor (not shown) such as a load cell for detecting the pressure of the molten resin within the injection cylinder 20.

The injection screw 22 is rotated in the positive and inverse directions by a screw rotating servo motor 23 via a transmission means 24 including pulleys and a timing belt. The injection screw 22 is driven by the injection servo motor 25 via a transmission means 26 including a mechanism for converting a rotary motion to a rectilinear motion, such as pulleys, a belt, and a ball screw/nut mechanism, and moves within the injection cylinder 20 along the axial direction of the injection cylinder 20.

The screw rotating servo motor 23 is provided with an encoder (not shown) for detecting the rotational position and rotational speed of the injection screw 22. The injection servo motor 25 is also provided with an encoder (not shown) for detecting the axial position and speed of the injection screw 22.

Next, a controller for controlling the injection molding machine will be described.

A controller 30 for controlling the injection molding machine includes a processor (CPU) 35, a memory 34 including RAM 34a and ROM 34b, a bus 33, and a display interface 36. The memory 34 and display interface 36 are connected to the CPU 35 via the bus 33.

The ROM 34b stores software for controlling the injection molding machine as a whole, such as software for controlling the operation of the movable platen 3 and ejection controlling software for controlling the ejector device 13. In an embodiment of the abnormality detector according to the present invention, the ROM 34b in the memory 34 stores various types of software for detecting abnormalities of the injection molding machine.

A liquid crystal display 37 is connected to the display interface 36. Servo amplifiers 31 for driving the movable units in the injection molding machine and controlling the position/speed of the servo motors are connected to a servo interface 32. Position/speed detectors attached to the servo motors for driving the movable units (including movable platen 3, ejector device 13, and injection screw 22) are connected to the servo amplifiers 31. An input means (not shown) for manual input is connected to the display interface 36.

Although a plurality of servo motors are used in the injection molding machine to drive the plurality of movable units, FIG. 1 shows only the servo amplifiers 31 for mold clamping servo motor 8 and ejector servo motor 13a. The servo amplifiers 31 are connected to the position/speed detectors 12, 13b attached to the servo motors 8, 13a and receive position/speed detection signals fed back from the position/speed detectors 12, 13b. The servo amplifiers for screw rotating servo motor 23 and injection servo motor 25 and the position/speed detectors attached to the servo motors 23, 25 are omitted from this figure.

The processor (CPU) 35 executes programs stored in the ROM 34b in the memory 34 on the basis of molding conditions or the like and outputs movement commands for the movable units in the injection molding machine to the servo amplifiers 31 via the servo interface 32. Each servo amplifier 31 drives and controls the servo motor (8, 13a) by feedback control of the position/speed of the servo motor (8, 13a) on the basis of the movement commands and the position/speed feedback signals from the associated position/speed detector (12, 13b) and by feedback control of the current on the basis of current feedback signals from the associated current detector (not shown). Each servo amplifier 31 includes a processor and a memory as in the prior art, and performs processes including this position/speed feedback control through software processing.

Methods for calculating a threshold value according to the present invention will now be described.

(Kurtosis)

Kurtosis is a measure indicating the degree of concentration of sample values around the mean and is typically calculated as in equation (1) below. For example, suppose that there are two distributions each having a variance value of 1, but one having a kurtosis value of 3 and the other having a kurtosis value of 10. The former distribution approximates a normal distribution, while the latter distribution has a more pointed peak and a longer tail than the former one. When a threshold value for abnormality detection is set for a load deviation distribution, it is necessary to set a higher threshold value for a distribution with a higher kurtosis to avoid erroneous detection.

$$\text{Kurtosis} = \frac{1}{N}\sum_{i=1}^{N}\left(\frac{Xi-u}{\sigma}\right)^4 \quad (1)$$

σ: Standard deviation u: Average value (Skewness)

Skewness is a measure indicating a distribution asymmetry and is typically calculated as in equation (2) below. For example, suppose that there are two distributions each having a variance value of 1, but one having a skewness value of 0 and the other having a skewness value of 10. The former distribution is a left-right symmetric distribution, while the latter distribution is a left-right asymmetric distribution with a longer tail on the right side. When a threshold value for abnormality detection is set for a load deviation distribution, it is necessary to set a higher threshold value for a distribution with a greater skewness to avoid erroneous detection.

$$\text{Skewness} = \frac{1}{N}\sum_{i=1}^{N}\left(\frac{Xi-u}{\sigma}\right)^3 \quad (2)$$

σ: Standard deviation u: Average value (Distribution Index Value Determined from High-Order Moment)

An m-th order central moment around the mean value of a sample distribution is typically expressed as in equation (3) below. The skewness described above is a distribution index value determined from the third-order central moment, while the kurtosis is a distribution index value determined from the fourth-order central moment. Here, a threshold value may be set depending on a distribution index value determined from the m-th order central moment (m≥3), similarly to the case in which a threshold value is set depending on the skewness or kurtosis. For example, a distribution index value may be obtained by dividing the m-th order central moment by the standard deviation raised to the m-th power. When this distribution index value is high, the threshold value may be increased to avoid erroneous detection. Alternatively, the m-th order central moment itself may be used as a distribution index value. When this distribution index value is high, the threshold value may be increased to avoid erroneous detection.

$$\mu_m = \frac{1}{N}\sum_{i=1}^{N}(X_i-u)^m \quad (3)$$

μm: m-th order central moment around mean value

Note that the kurtosis, skewness, and m-th order central moment in the present invention may be determined using equations (1), (2), and (3) above, or using equations for determining approximate values of equations (1), (2), and (3). For example, instead of obtaining the kurtosis with equation (1) above, equations (4) and (5) below may be used to determine an approximately calculated kurtosis value. Alternatively, well-known equations may be used to determine kurtosis, skewness, and m-th order central moment, respectively.

(Calculation of Threshold Value on the Basis of Kurtosis, Skewness, or High-Order Moment)

1. Current load on a movable unit is compared with the previously stored reference load in association with the time or the position of the movable unit and a load deviation corresponding to the time or the position of the movable unit is stored.

2. Step 1 above is repeated in a plurality of cycles.

3. On the basis of the load deviations stored in the plurality of cycles, at least one of kurtosis, skewness, and high-order moment of the load deviations is calculated as a distribution index value in association with the time or the position of the movable unit.

4. A threshold value corresponding to the time or the position of the movable unit is calculated such that the threshold value increases as the distribution index value increases.

5. The load deviation and the threshold value are compared with each other in association with the time or the position of the movable unit and when the deviation exceeds the threshold value, an abnormality of the movable unit is detected.

6. A threshold value corresponding to the time or the position of the movable unit is calculated in each cycle by repeating steps 3-5 above while the cycle operation continues, so that abnormalities can be detected with an optimum threshold value.

(Calculation of Threshold Value on the Basis of Approximately Calculated Value of Kurtosis, Skewness, or High-Order Moment)

When a threshold value is calculated on the basis of the kurtosis, skewness, or high-order moment as defined as described above, it is necessary to store all the load deviations in the plurality of cycles, which requires a large storage capacity. To save storage capacity, a threshold value may be calculated on the basis of an approximately calculated value of kurtosis, skewness, or high-order moment.

1. A load deviation corresponding to the time or the position of the movable unit is calculated by comparing the current load on a movable unit and the previously stored reference load with each other in association with the time or the position of the movable unit.

2. An absolute value of the calculated deviation is calculated.

3. An average absolute deviation value corresponding to the time or the position of the movable unit is calculated by calculating equation (4) below in association with the time or the position of the movable unit and is stored.

$$R(n,x) = \frac{|E(n,x)|}{n} + R(n-1,x)\cdot\frac{n-1}{n} \quad (4)$$

n: Number of cycles since the calculation of threshold values is initiated, x: Elapsed time or position of movable unit, R (n, x): Average value of absolute deviations at x in first to n-th cycles, E (n, x): Deviation at x in n-th cycle.

4. A distribution index value corresponding to the time or the position of the movable unit is calculated by calculating equation (5) below in association with the time or the position of the movable unit and is stored.

$$K(n, x) = \frac{E(n, x)^m}{R(n, x)^m} \cdot \frac{1}{n} + K(n-1, x) \cdot \frac{R(n-1, x)^m}{R(n, x)^m} \cdot \frac{n-1}{n} \quad (5)$$

K(n, x): Approximate value of distribution index values at x in first- to n-th cycles, m: Order of moment (m≥3)

5. A threshold value corresponding to the time or the position of the movable unit is calculated such that the threshold value increases as the distribution index value increases.

6. The calculated threshold value and the calculated absolute deviation value are compared with each other in association with the time or position of the movable unit and, when the absolute deviation value exceeds the threshold value, an abnormality of the movable unit is detected.

7. Steps 1-6 above are repeated while the cycle operation continues to calculate a threshold value corresponding to the time or the position of the movable unit in each cycle, so that abnormalities can be detected with optimum threshold values.

(Calculation of Threshold Value on the Basis of Distribution Index Value)

In the above description, a threshold value corresponding to the time or the position of the movable unit may be calculated on the basis of a distribution index value using equation (6) below.

$$L(n,x) = \alpha \cdot K(n,x) + \beta \quad (6)$$

L(n, x): Threshold value at x in n-th cycle,

α, β: Coefficients (α>0).

(Coefficients α and β)

The abnormality detection sensitivity can be adjusted by adjusting the settings of coefficients α and β in equation (6) above. When coefficients α and β are set to small values, the abnormality detection sensitivity is enhanced and therefore the probability of erroneous abnormality detection increases. On the other hand, when coefficients α and β are set to high values, the abnormality detection sensitivity is lowered and therefore the probability of erroneous abnormality detection decreases. The operator may adjust the values of coefficients α and β judging from an abnormality detection sensitivity required for a molded product or from an erroneous detection probability acceptable for a production situation, for example.

(Use of Average Load Value Instead of Reference Load)

In the above examples, the load deviation corresponding to the time or the position of the movable unit is calculated by comparing the current load on the movable unit and the previously stored reference load with each other in association with the time or the position of the movable unit. Alternatively, the current load may be compared with an average value calculated from the loads applied over a plurality of cycles since the threshold calculation is initiated to the current cycle. For example, an average load value corresponding to the time or the position of the movable unit may be calculated in each cycle using equation (7) below.

$$Dmean(n,x) = D(n,x)/n + Dmean(n-1,x) \cdot (n-1)/n \quad (7)$$

n: Number of cycles since the calculation of threshold values is initiated, x: Elapsed time or position of the movable unit, Dmean(n, x): Average value of loads at x in first to n-th cycles, D(n, x): Load at x in n-th cycle.

(Means for Detecting Loads)

Load on a movable unit may be detected by a well-known disturbance load observer implemented within a servo circuitry or by a detecting means such as a strain gauge provided in the movable unit. Alternatively, drive current, speed, or position error of the servo motor may be used as a physical quantity for detecting the load. For example, the load may be detected on the basis of the current driving the servo motor. Alternatively, the load may be detected on the basis of the fact that a speed of a servo motor decreases if a load is applied in the direction opposite to the travelling direction of a movable unit, whereas a speed of the servo motor increases if a load is applied in the same direction as the travelling direction of the movable unit. Alternatively, the load may be detected on the basis of the fact that a position error of the servo motor is increased if a load is applied in the direction opposite to the travelling direction of the movable unit, whereas a position error of the servo motor is decreased if a load is applied in the same direction as the travelling direction of the movable unit.

(Movable Unit Subjected to Abnormality Detection)

The movable units that can be subjected to abnormality detection include the movable platen 3, ejector device 13, and injection screw 22 described above, as well as a drive unit for driving a nested piece in the mold and a drive unit for driving the unscrewing unit of the mold.

Processes for setting a threshold value using the above equations will now be described with reference to the flowcharts in FIGS. 2-5.

Figure 2:
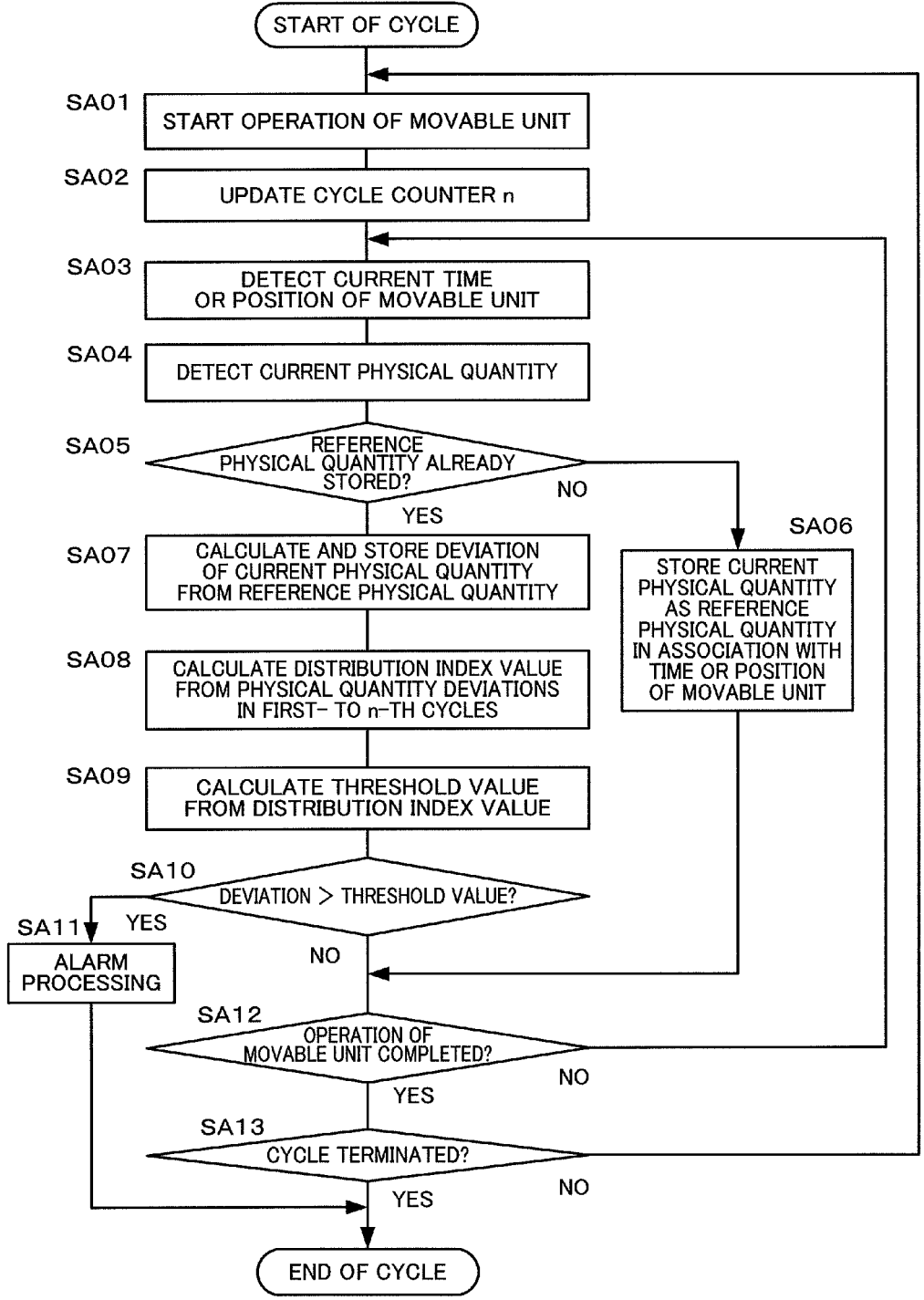
FIG. 2 is a flowchart illustrating a first example of the abnormality detecting process performed by the abnormality detector of the present invention.

First, the first example of the abnormality detecting process performed by the abnormality detector of the present invention will be described with reference to the flowchart in FIG. 2. In the abnormality detecting process in this example, a deviation of the current physical quantity from a reference physical quantity is calculated, a threshold value is then calculated from a distribution index value of the calculated deviations, and the calculated threshold value is used to detect abnormalities. The process will now be described in the order of steps.

[Step SA01] Operation of a movable unit is started.

[Step SA02] Cycle counter is updated to n of which an initial value is 1.

[Step SA03] The current time or the position of the movable unit is detected.

[Step SA04] The current physical quantity is detected.

[Step SA05] Whether a reference physical quantity is already stored or not is determined. If it is already stored (decision: YES), the process proceeds to Step SA07, but if it is not stored yet (decision: NO), the process proceeds to Step SA06.

[Step SA06] The current physical quantity is stored as the reference physical quantity in association with the elapsed time of operation of the movable unit or the position of movable unit, and the process proceeds to Step SA12.

[Step SA07] A deviation of the current physical quantity detected in Step SA04 from the reference physical quantity stored in Step SA06 is calculated and stored.

[Step SA081] A distribution index value is calculated from the physical quantity deviations in the first to n-th cycles.

[Step SA09] A threshold value is calculated from the distribution index value calculated in Step SA08.
[Step SA10] Whether the deviation stored in Step SA07 is larger than the threshold value or not is calculated in Step SA09. If it is larger (decision: YES), the process proceeds to Step SA11, but if it is not larger (decision: NO), the process proceeds to Step SA12.
[Step SA11] Alarm processing is performed and the current cycle is terminated.
[Step SA12] Whether the operation of the movable unit is completed or not is determined. If it is completed (decision: YES), the process proceeds to Step SA13, but if it is not completed yet (decision: NO), the process returns to Step SA03 to continue the processing.
[Step SA13] Whether the cycle is terminated or not is determined. If it is terminated (decision: YES), the cycle is terminated, but if it is not terminated yet (decision: NO), the process returns to Step SA01 to continue processing.

Figure 3:
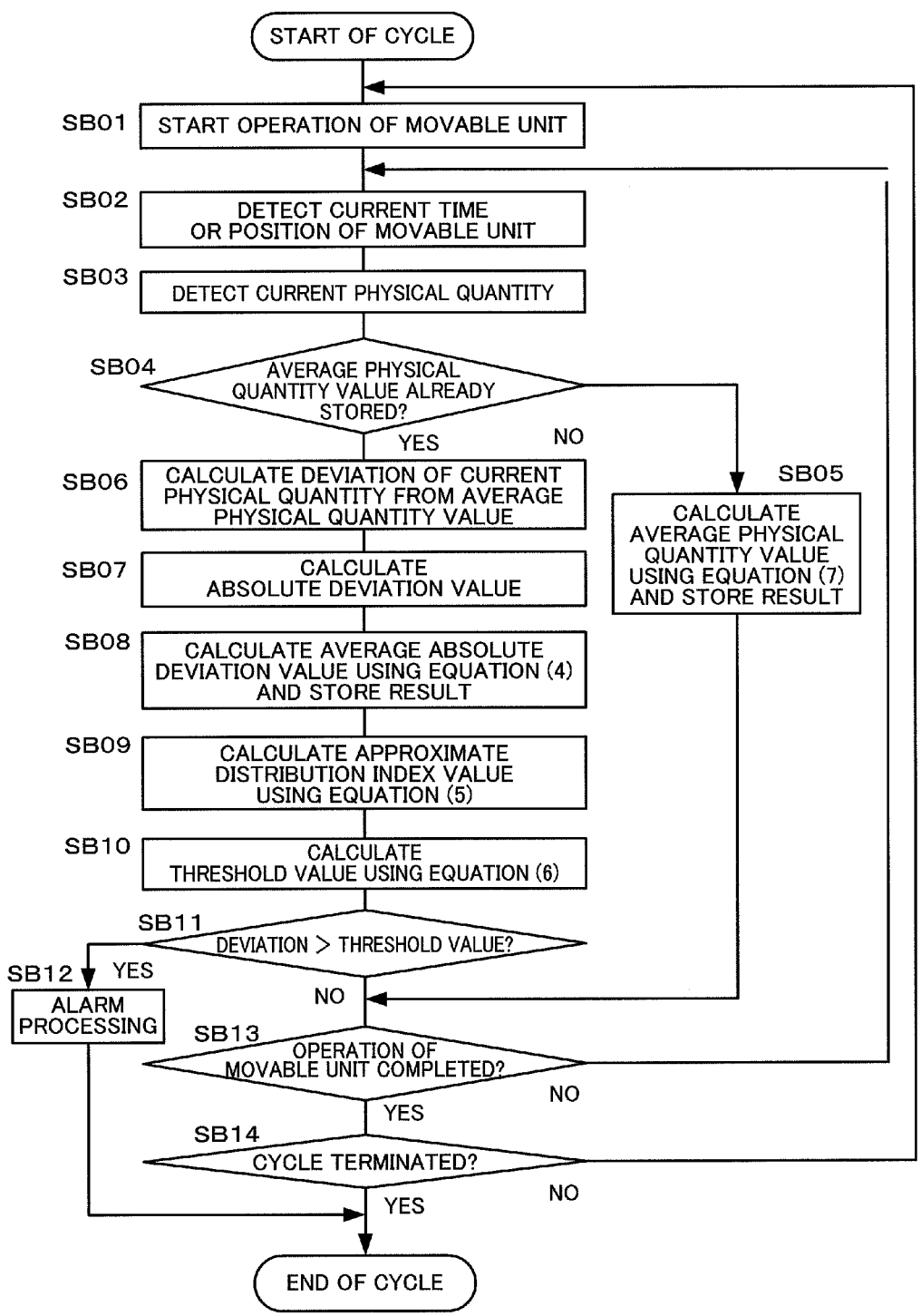
FIG. 3 is a flowchart illustrating a second example of the abnormality detecting process performed by the abnormality detector of the present invention.

Next, the second example of the abnormality detecting process performed by the abnormality detector of the present invention will be described with reference to the flowchart in FIG. 3. In the abnormality detecting process in this example, a deviation of the current physical quantity from an average physical quantity value is calculated, a threshold value is then calculated on the basis of a distribution index value of the calculated deviations, and the calculated threshold value is used to detect abnormalities. The process will now be described in the order of steps.
[Step SB01] Operation of a movable unit is started.
[Step SB02] The current time or the position of the movable unit is detected.
[Step SB03] The current physical quantity is detected.
[Step SB04] Whether an average physical quantity value has already been stored or not is determined. If it has already been stored (decision: YES), the process proceeds to Step SB06, but it has not been stored yet (decision: NO), the process proceeds to Step SB05.
[Step SB05] An average physical quantity value is calculated using equation (7) and stored, and the process proceeds to Step SB13.
[Step SB06] A deviation of the current physical quantity detected in Step SB03 from the average physical quantity value stored in Step SB05 is calculated.
[Step SB07] An absolute value of the deviation calculated in Step SB06 is calculated.
[Step SB08] An average absolute deviation value is calculated, using equation (4), from the absolute deviation value calculated in Step SB07 and stored.
[Step SB09] An approximate distribution index value is calculated, using equation (5), from the average absolute deviation value stored in Step SB08.
[Step SB10] A threshold value is calculated, using equation (6), from the approximate distribution index value calculated in Step SB09.
[Step SB11] Whether or not the deviation calculated in Step SB06 is larger than the threshold value calculated in Step SB10 is determined. If it is larger (decision: YES), the process proceeds to Step SB12, but if it is not larger (decision: NO), the process proceeds to Step SB13.
[Step SB12] Alarm processing is performed and the current cycle is terminated.
[Step SB13] Whether the operation of the movable unit is completed or not is determined. If it is completed (decision: YES), the process proceeds to Step SB14, but if it is not completed (decision: NO), the process returns to Step SB02 to continue processing.
[Step SB14] Whether the current cycle is terminated or not is determined. If it is terminated (decision: YES), the current cycle is terminated, but if it is not terminated (decision: NO), the process returns to Step SB01 to continue processing.

Figure 4:
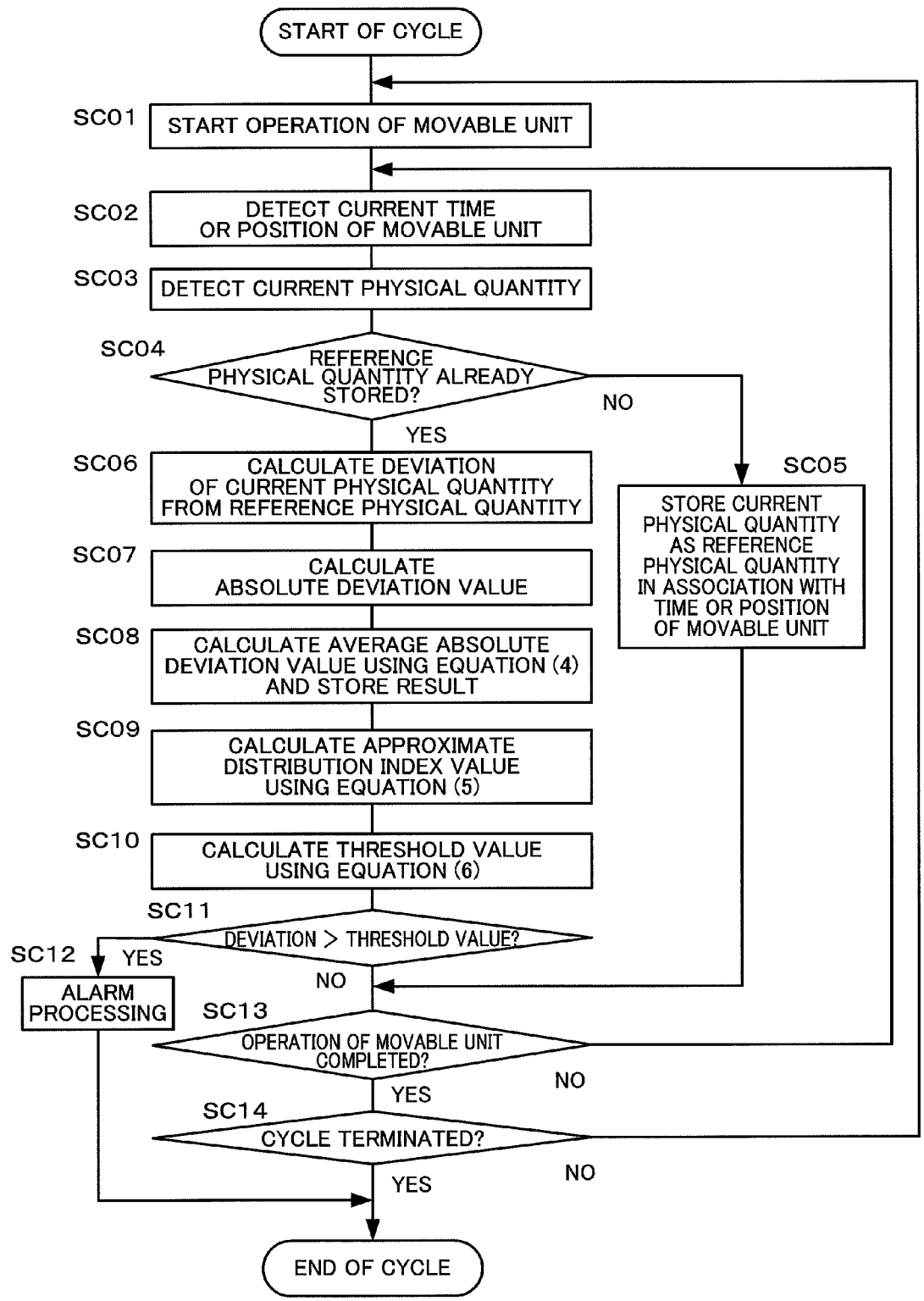
FIG. 4 is a flowchart illustrating a third example of the abnormality detecting process performed by the abnormality detector of the present invention.

Next, the third example of the abnormality detecting process performed by the abnormality detector of the present invention will be described with reference to the flowchart in FIG. 4. In the abnormality detecting process in this example, a deviation of the current physical quantity from a reference physical quantity is calculated, a threshold value is then calculated on the basis of an approximate distribution index value of the calculated deviations, and the calculated threshold value is used to detect abnormalities. The process will now be described in the order of steps.
[Step SC01] Operation of a movable unit is started.
[Step SC02] The current time or the position of the movable unit is detected.
[Step SC03] The current physical quantity is detected.
[Step SC04] Whether a reference physical quantity has already been stored or not is determined. If it has already been stored (decision: YES), the process proceeds to Step SC06, but if it has not been stored yet (decision: NO), the process proceeds to Step SC05.
[Step SC05] The current physical quantity is stored as the reference physical quantity in association with the elapsed time of operation of the movable unit or the position of movable unit, and the process proceeds to Step SC13.
[Step SC06] A deviation of the current physical quantity detected in Step SC03 from the reference physical quantity stored in Step SC05 is calculated.
[Step SC07] An absolute value of the deviation calculated in Step SC06 is calculated.
[Step SC08] An average absolute deviation value is calculated, using equation (4), from the absolute deviation values calculated in Step SC07 and stored.
[Step SC09] An approximate distribution index value is calculated, using equation (5), from the average absolute deviation value stored in Step SC08.
[Step SC10] A threshold value is calculated, using equation (6), from the approximate distribution index value calculated in Step SC09.
[Step SC11] Whether or not the deviation calculated in Step SC06 is larger than the threshold value calculated in Step SC10 is determined. If it is larger (decision: YES), the process proceeds to Step SC12, but if it is not larger (decision: NO), the process proceeds to Step SC13.
[Step SC12] Alarm processing is performed and the current cycle is terminated.
[Step SC13] Whether the operation of the movable unit is completed or not is determined. If it is completed (decision: YES), the process proceeds to Step SC14, but if it is not completed yet (decision: NO), the process returns to Step SC02 to continue processing.
[Step SC14] Whether the current cycle is terminated or not is determined. If it is terminated (decision: YES), the current cycle is terminated, but if it is not terminated (decision: NO), the process returns to Step SC01 to continue processing.

Figure 5:
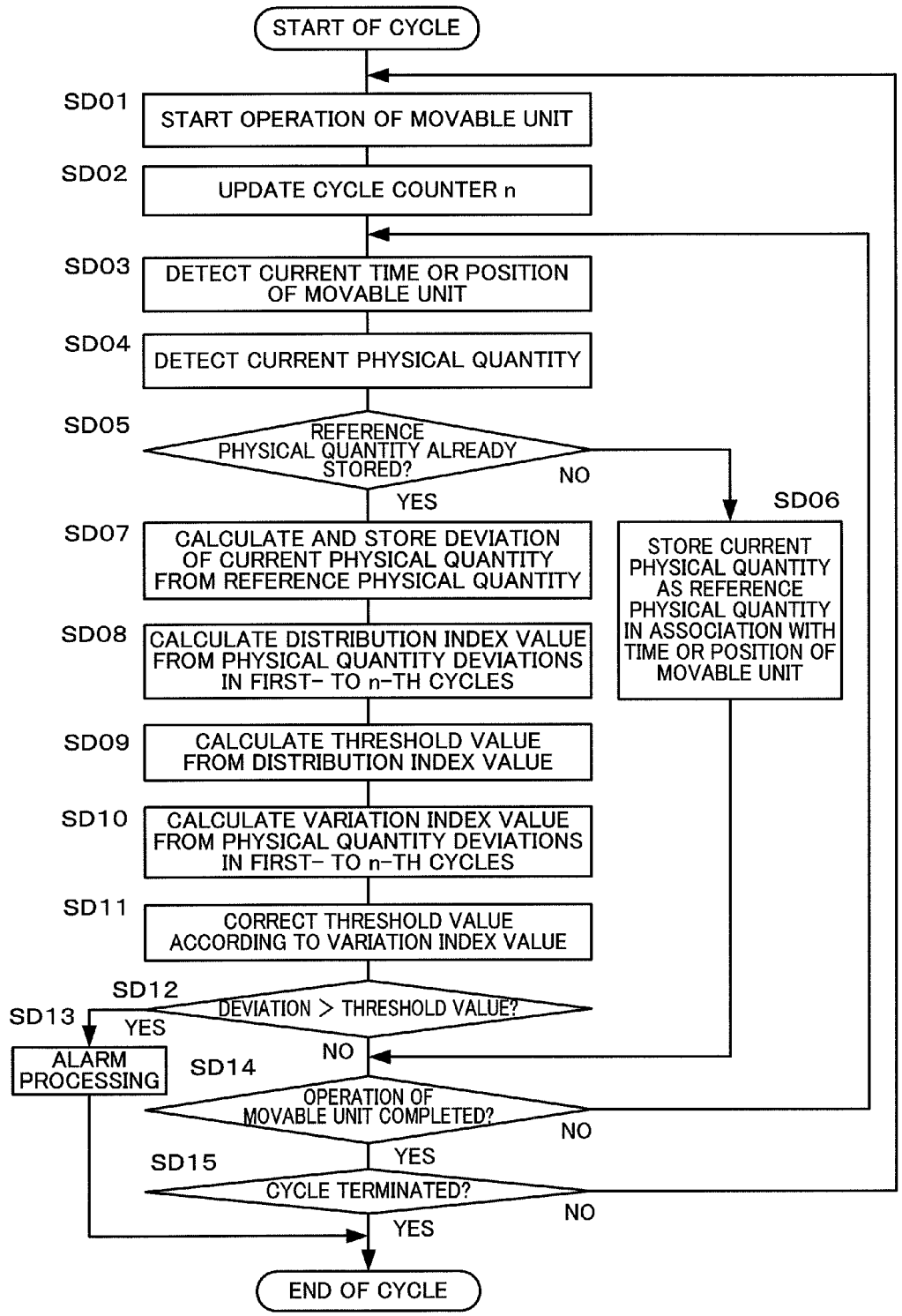
FIG. 5 is a flowchart illustrating a fourth example of the abnormality detecting process performed by the abnormality detector of the present invention.

Next, the fourth example of the abnormality detecting process performed by the abnormality detector of the present invention will be described with reference to the flowchart in FIG. 5. In the abnormality detecting process in this example, a deviation of the current physical quantity from a reference physical quantity is calculated, a threshold value is then calculated on the basis of an distribution index value of the calculated deviations, and the calculated threshold value is used to detect abnormalities. The process will now be described in the order of steps.

[Step SD01] Operation of a movable unit is started.
[Step SD02] Cycle counter is updated to n of which an initial value is 1.
[Step SD03] The current time or the position of the movable unit is detected.
[Step SD04] The current physical quantity is detected.
[Step SD05] Whether or not a reference physical quantity has already been stored or not is determined. If it has already been stored (decision: YES), the process proceeds to Step SD07, but if it has not been stored yet (decision: NO), the process proceeds to Step SD06.
[Step SD06] The current physical quantity is stored as the reference physical quantity in association with the elapsed time of operation of the movable unit or the position of movable unit, and the process proceeds to Step SD14.
[Step SD07] A deviation of the current physical quantity detected in Step SD04 from the reference physical quantity stored in Step SD06 is calculated and stored.
[Step SD08] A distribution index value is calculated from the physical quantity deviations in the first to n-th cycles.
[Step SD09] A threshold value is calculated from the distribution index value calculated in Step SD08.
[Step SD10] A variation index value is calculated from the physical quantity deviations in the first to n-th cycles. The calculated deviation variation index value includes any one of the standard deviation and variance of the physical quantities, average absolute deviation value, and maximum-minimum values.
[Step SD11] The threshold value calculated in Step SD09 is corrected according to the variation index value calculated in Step SD10.
[Step SD12] Whether or not the deviation stored in Step SD07 is larger than the threshold value corrected in Step SD11 is determined. If it is larger (decision: YES), the process proceeds to Step SD13, but if it is not larger (decision: NO), the process proceeds to Step SD14.
[Step SD13] Alarm processing is performed and the current cycle is terminated.
[Step SD14] Whether the operation of the movable unit is completed or not is determined. If it is completed (decision: YES), the process proceeds to Step SD15, but if it is not completed yet (decision: NO), the process returns to Step SD03 to continue processing.
[Step SD15] Whether the current cycle is terminated or not is determined. If it is terminated (decision: YES), the current cycle is terminated, but if it is not terminated (decision: NO), the process returns to Step SD01 to continue processing.

The invention claimed is:

1. An abnormality detector for an injection molding machine, comprising:
   a drive unit for driving a movable unit by driving and controlling a servo motor;
   a physical quantity detecting unit for detecting any one of physical quantities which include a load applied to the servo motor and speed, current and position error of the servo motor;
   a storage unit for storing the physical quantity detected by the physical quantity detecting unit as a reference physical quantity in association with an elapsed time of operation of the movable unit or a position of the movable unit in operation;
   a physical quantity deviation calculating unit for determining a deviation by sequentially comparing the current physical quantity with the reference physical quantity stored in the storage unit, in association with the elapsed time of operation of the movable unit or the position of the movable unit in operation;
   a distribution index value calculating unit for calculating at least one of kurtosis and skewness of the determined physical quantity deviation and a distribution index value determined from a third- or higher-order moment as a distribution index value in association with the elapsed time of operation of the movable unit or the position of the movable unit in operation; and
   a threshold value calculating unit for calculating a threshold value corresponding to the elapsed time of operation of the movable unit or the position of the movable unit in operation, such that the threshold value increases as the distribution index value calculated by the distribution index value calculating unit increases;
   wherein, when the deviation determined by the physical quantity deviation calculating unit exceeds the threshold value calculated by the threshold value calculating unit, an abnormality is detected.

2. An abnormality detector for an injection molding machine, comprising:
   a drive unit for driving a movable unit by driving and controlling a servo motor;
   a physical quantity detecting unit for detecting any one of physical quantities which include a load applied to the servo motor and speed, current and position error of the servo motor;
   a calculating unit for calculating an average value of the physical quantities detected by the physical quantity detecting unit over a predetermined number of cycles, in association with the elapsed time of operation of the movable unit or the position of the movable unit in operation;
   a storage unit for storing the average physical quantity value calculated by the calculating unit;
   a physical quantity deviation calculating unit for determining a deviation by sequentially comparing the current physical quantity with the average physical quantity value stored in the storage unit, in association with the elapsed time of operation of the movable unit or the position of the movable unit in operation;
   a distribution index value calculating unit for calculating at least one of kurtosis and skewness of the determined physical quantity deviation and a distribution index value determined from a third- or higher-order moment as a distribution index value in association with the elapsed time of operation of the movable unit or the position of the movable unit in operation; and
   a threshold value calculating unit for calculating a threshold value corresponding to the elapsed time of operation of the movable unit or the position of the movable unit in operation, such that the threshold value increases as the distribution index value calculated by the distribution index value calculating unit increases;
   wherein, when the deviation determined by the physical quantity deviation calculating unit exceeds the threshold value calculated by the threshold value calculating unit, an abnormality is detected.

3. The abnormality detector for an injection molding machine according to claim 1, further comprising:
   an average value calculating unit for calculating an average value of absolute physical quantity deviations by computing an equation below in association with the elapsed time of operation of the movable unit or the position of the movable unit in operation;

$$R(n, x) = \frac{|E(n, x)|}{n} + R(n-1, x) \cdot \frac{n-1}{n}$$

n: Number of cycles since calculation of threshold value is initiated,
x: Elapsed time or position of movable unit
R(n, x): Average value of absolute deviations at x in first to n-th cycles,
E(n, x): Deviation at x in n-th cycle;
wherein the distribution index value calculating unit calculates a distribution index value by computing an equation below from the average value of absolute physical quantity deviations calculated by the average value calculating unit, in association with the elapsed time of operation of the movable unit or the position of the movable unit in operation;

$$K(n, x) = \frac{E(n, x)^m}{R(n, x)^m} \cdot \frac{1}{n} + K(n-1, x) \cdot \frac{R(n-1, x)^m}{R(n, x)^m} \cdot \frac{n-1}{n}$$

K(n, x): Approximate value of distribution index values at x in first to n-th cycles
m: Order of moment (m≥3);
wherein the threshold value calculating unit calculates a threshold value by computing an equation below from the distribution index value calculated by the distribution index value calculating unit, in association with the elapsed time of operation of the movable unit or the position of the movable unit in operation;

$$L(n,x) = \alpha \cdot K(n,x) + \beta$$

L(n, x): Threshold value at x in n-th cycle,
α, β: Coefficients (α>0).

4. The abnormality detector for an injection molding machine according to claim 1, further comprising:
a variation index calculating unit for calculating a variation index of the determined deviations in association with the elapsed time of operation of the movable unit or the position of the movable unit in operation; and
a threshold value correcting unit for correcting the threshold value corresponding to the elapsed time of operation of the movable unit or the position of the movable unit in operation, such that the threshold value increases as the variation index calculated by the variation index calculating unit increases.

5. The abnormality detector for an injection molding machine according to claim 4, wherein the variation index calculating unit calculates as a deviation variation index any one of a standard deviation and variance of the physical quantity, an average value of absolute deviations, and maximum/minimum values.

6. The abnormality detector for an injection molding machine according to claim 2, further comprising:
an average value calculating unit for calculating an average value of absolute physical quantity deviations by computing an equation below in association with the elapsed time of operation of the movable unit or the position of the movable unit in operation;

$$R(n, x) = \frac{|E(n, x)|}{n} + R(n-1, x) \cdot \frac{n-1}{n}$$

n: Number of cycles since calculation of threshold value is initiated,
x: Elapsed time or position of movable unit
R(n, x): Average value of absolute deviations at x in first to n-th cycles,
E(n, x): Deviation at x in n-th cycle;
wherein the distribution index value calculating unit calculates a distribution index value by computing an equation below from the average value of absolute physical quantity deviations calculated by the average value calculating unit, in association with the elapsed time of operation of the movable unit or the position of the movable unit in operation;

$$K(n, x) = \frac{E(n, x)^m}{R(n, x)^m} \cdot \frac{1}{n} + K(n-1, x) \cdot \frac{R(n-1, x)^m}{R(n, x)^m} \cdot \frac{n-1}{n}$$

K(n, x): Approximate value of distribution index values at x in first to n-th cycles
m: Order of moment (m≥3);
wherein the threshold value calculating unit calculates a threshold value by computing an equation below from the distribution index value calculated by the distribution index value calculating unit, in association with the elapsed time of operation of the movable unit or the position of the movable unit in operation;

$$L(n,x) = \alpha \cdot K(n,x) + \beta$$

L(n, x): Threshold value at x in n-th cycle,
α, β: Coefficients (α>0).

7. The abnormality detector for an injection molding machine according to claim 2, further comprising:
a variation index calculating unit for calculating a variation index of the determined deviations in association with the elapsed time of operation of the movable unit or the position of the movable unit in operation; and
a threshold value correcting unit for correcting the threshold value corresponding to the elapsed time of operation of the movable unit or the position of the movable unit in operation, such that the threshold value increases as the variation index calculated by the variation index calculating unit increases.

8. The abnormality detector for an injection molding machine according to claim 7, wherein the variation index calculating unit calculates as a deviation variation index any one of a standard deviation and variance of the physical quantity, an average value of absolute deviations, and maximum/minimum values.

* * * * *